United States Patent Office 2,714,117
Patented July 26, 1955

2,714,117

PRODUCTION OF ACETOACETIC ACID AMIDES

Richard Norman Lacey and Ernest Edward Connolly, Hull, England, assignors to British Industrial Solvents Limited, London, England, a British company No Drawing. Application August 12, 1952, Serial No. 304,005

Claims priority, application Great Britain August 27, 1951

10 Claims. (Cl. 260—471)

The present invention relates to the reaction of diketene with aromatic amines and the production thereby of the corresponding acetoacetic acid amides which are useful intermediates.

When reacting diketene with aromatic amines it is essential that the temperature should not be allowed to rise to such an extent that decomposition of the diketene occurs. For instance, above 150° C. considerable resin formation takes place and highly discoloured products result. It is therefore desirable, if good yields of high quality products are to be obtained, that the temperature of the reaction mixture should be kept as low as possible and generally it is preferred to carry out the reaction at temperatures below 100° C. It is found, however, that as the temperature of the reaction mixture is decreased, the rate of the formation of the acetoacetic acid amide is reduced and consequently if the temperature is reduced too far, the reaction is no longer practicable. With unsubstituted primary aromatic amines it is known that the reaction proceeds readily at moderate temperatures to give good yields of high quality products. However, when attempts are made to react certain substituted aromatic amines with diketene to produce the corresponding acetoacetic acid amides it is found that, at the moderate temperatures preferably employed, the reaction rates are so slow that the method for the preparation of the amides is no longer practicable. Furthermore, unless the reaction goes to completion, material may be deposited in the solvent storage tanks. Consequently, it is necessary to increase the temperature of the reaction mixture with the result that poor yields of inferior quality amide are produced.

The reactivity of aromatic amines is roughly proportional to their dissociation constants. The following table shows the dissociation constant for some aromatic amines:

Table I

| Amine: | Dissociation constant |
|---|---|
| Aniline | $5 \times 10^{-10}$ |
| m-Toluidine | $5 \times 10^{-10}$ |
| p-Toluidine | $2 \times 10^{-10}$ |
| o-Toluidine | $3.4 \times 10^{-10}$ |
| m-Nitroaniline | $4 \times 10^{-12}$ |
| p-Nitroaniline | $1.24 \times 10^{-13}$ |
| o-Nitroaniline | $5.6 \times 10^{-15}$ |
| m-Chloroaniline | $4 \times 10^{-11}$ |
| p-Chloroaniline | $1. \times 10^{-12}$ |
| o-Chloroaniline | $9 \times 10^{-13}$ |
| m-Aminobenzoic acid methyl ester | $4.4 \times 10^{-12}$ |
| p-Aminobenzoic acid methyl ester | $2.4 \times 10^{-12}$ |
| o-Aminobenzoic acid methyl ester (methyl anthranilate) | $1.5 \times 10^{-12}$ |
| Benzidine | $7.4 \times 10^{-13}$ |
| Diphenylamine | $7.6 \times 10^{-14}$ |

Of the amines listed above, only aniline and the three toluidines react readily with diketene at moderate temperatures in accordance with the known process whereby good yields of high quality amides are produced. The other amines require higher temperatures to bring about the reaction with the result that lower yields of coloured, inferior products are obtained. It will be noted that the dissociation constants of these unreactive amines are smaller than $9 \times 10^{-11}$ and it has been found generally that aromatic amines with dissociation constants lower than this figure are unreactive in the known process and will hereinafter be termed "normally unreactive aromatic amines."

The object of the present invention is to provide a process whereby good yields of high quality amides may be produced by the reaction of diketene with these unreactive amines at moderate temperatures.

The invention accordingly comprises the novel processes and steps of processes, specific embodiments of which are described hereinafter by way of example and in accordance with which we now prefer to practice the invention.

It has now been found, surprisingly, that the presence in the reaction mixture of small quantities of a basic tertiary amine, as an enolising catalyst catalyses the reaction of diketene with aromatic amines so that improved yields of high quality amides may be produced at lower reaction temperatures than are required in the uncatalysed reaction. This was a surprising discovery because it was known that basic tertiary amines increased the polymerisation rate of diketene to dehydroacetic acid and it was therefore expected that their presence in the reaction mixture would lead to increased byproduct resin formation with a consequent lower yield of the amide. This catalytic effect allows the production of amides of unreactive amines by reacting them with diketene at lower temperatures than has hitherto been possible with the result that improved yields on the diketene consumed of superior quality amide are produced.

Accordingly, the present invention provides a process for the production of acetoacetic acid amides from normally unreactive aromatic amines, as hereinbefore defined, which comprises reacting the normally unreactive aromatic amine with diketene in the presence of the reaction mixture of a basic tertiary amine, or the salt of such a tertiary amine with a weak acid.

It will be noted that all the primary amines listed in Table 1 have negative substituents attached to the benzene ring which inactivate the amine group and lower its dissociation constant. Such substituents are for example a halogen atom, or a —NO₂, —COOR, —COR, SO₃R or phenyl group, where R represents an alkyl group. Substances useful accordingly in the present process include, without limitation, para-nitroaniline, meta- and para-chloroaniline, meta-, para, and ortho-aminobenzoic acid methyl esters and benzidine as well as ortho, meta- and paraamino-acetophenones and esters of amino-benzene sulphonic acids. It will further be noted that the effect of the negative substituent in reducing the dissociation constant of the amine is greatest when the substituent occupies the ortho position with respect to the amine group. Consequently, the process of the present invention is most advantageous when applied to those amines which have a negative substituent in the ortho-position.

It will be appreciated that certain secondary aromatic amines will have low dissociation constants and accordingly their acetoacetic acid amides may be prepared advantageously according to the process of the present invention.

The basic tertiary amine catalyst may be any basic amine which possesses a tertiary nitrogen atom, for example trimethylamine, conveniently in alcohol solution, triethylamine, tripropylamine, tri-isopropylamine, tributylamine, triethanolamine, picoline and the like and salts thereof with weak acids. It is preferred to use trimethylamine or triethylamine since these compounds are very efficient catalysts and are readily available. Only very small quantities of the basic tertiary amine catalyst are required to bring about the reaction of diketene with normally unreactive aromatic amines, although the exact quantity used in any given preparation varies with the amine and the temperature at which the reaction is carried out.

The reaction may be carried out directly between the diketene and the amine although it is generally more convenient to add an inert diluent which is preferably a solvent for the reactants. Examples of such diluents are benzene and toluene. Generally, it is preferred to add the diketene slowly to a solution of the aromatic amine and basic tertiary amine catalyst in a suitable inert solvent.

The following examples illustrate how the process of the present invention may be carried out in practice and show the advantages gained by the use of a basic tertiary amine catalyst. The parts referred to are by weight. All examples were carried out at atmospheric pressure.

EXAMPLE 1

21 parts of diketene was stirred into 38 parts of methyl anthranilate containing 0.15 part of triethylamine over a period of 20 minutes. The reaction mixture was maintained between 60°–70° C. for a further half hour until the reaction was complete when a yield of 88.5% by weight of the acetoacetic acid amide of methyl anthranilate, melting at 73° C., was obtained. When the experiment was repeated omitting the triethylamine catalyst it was necessary to raise the temperature of the reaction mixture to 110° C. in order to make the reaction proceed at an equal rate, and give a comparable yield.

EXAMPLE 2

43 parts of diketene was added over a period of three quarters of an hour to an agitated, refluxing solution of 76 parts of methyl anthranilate in 88 parts of benzene containing 0.73 part of triethylamine. When the addition was completed the mixture was refluxed for a further half hour at 93° C. and the solvent was then removed to give a yield of 88.5% by weight of the arylide, melting at 74° C.

The acetoacetic acid amide produced in Examples 1 and 2 was recrystallised to yield the pure arylide, melting at 79–80° C.

EXAMPLE 3

2.9 parts of diketene was added to an agitated solution of 5 parts of m-nitro-p-toluidine in 52 parts of toluene containing 0.15 part of triethylamine at 40° C. The addition was spread over a period of 20 minutes after which the reaction mixture was maintained at 40° C. for a further hour. The solvent was then removed to afford a 90% by weight yield of the acetoacetic acid amide of m-nitro-p-toluidine.

A further sample of m-nitro-p-toluidine was treated under identical conditions but in the absence of the triethylamine catalyst. After the same reaction time, the amine was recovered from the reaction mixture unchanged.

EXAMPLE 4

20 parts of o-chloroaniline was dissolved in 52 parts of toluene which had previously been saturated with acetoacet-o-chloroanilide. 0.015 part of a 30% by weight alcoholic trimethylamine was added and the mixture brought to 60° C. and 13.6 parts of diketene added over a period of half an hour. The reaction was rapid and after one hour at 60° C. followed by cooling afforded a yield of 97.7% by weight of arylide, melting at 105–106° C.

In the absence of the trimethylamine, further portions of 20 parts of o-chloroaniline in 130 parts of toluene were reacted with 19.3 parts of diketene (94% purity) at 60° C. and at 75° C. and the percentage yield of product after varying periods of time were ascertained. The results are shown in the following table:

Table II

| Time, Hours | Percent weight product | |
| --- | --- | --- |
| | 60° C. | 75° C. |
| 1 | 60.6 | 73.3 |
| 2 | 68.1 | 78.1 |
| 3 | 74.8 | 82.9 |
| 4 | 76.0 | 83.2 |
| 5 | 78.3 | 84.7 |

EXAMPLE 5

Diketene (8.7 parts 98% pure) was added over a period of half an hour to an agitated solution of o-nitroaniline (13.8 parts) in benzene (44 parts) containing 0.15 part triethylamine at 60° C. After heating at 60° for a further half hour, the solution was evaporated in vacuo to leave acetoacet-o-nitroanilide (17.5 parts) melting at 62–4° C. Crystallisation from ethyl acetate-petroleum ether boiling point 60–80° gave the pure arylide as pale yellow needles melting point 65°.

Treatment as above, omitting the catalyst, gave a mixture of products consisting mainly of the unchanged amine.

EXAMPLE 6

To a refluxing, agitated solution of diphenylamine (16.9 parts) in benzene (35 parts) containing 0.37 part triethylamine, was added diketene (9.0 parts, 97% pure) over 15 minutes. After refluxing for a further 15 minutes at 88° C., the product was evaporated in vacuo to give 26.9 parts solid, melting at 78–80°. Crystallisation from aqueous methanol gave the pure N:N-diphenylaceto-acetamide, melting point 82–3°.

In a further experiment, the catalyst was omitted and the diphenylamine was recovered almost completely unchanged.

Tripropylamine, tri-isopropylamine, tributylamine, triethanolamine and picoline may be substituted for trimethylamine or triethylamine in the above examples employing equivalent amounts of the substituted materials mentioned. In some cases the diketene used contained some free acetic acid so that the tertiary amine catalyst was present in the form of its salt, which, however, is strongly dissociated.

We claim:

1. A process for the production of a pale-coloured acetoacetic acid amide which comprises reacting an arylamine having at least one —NH— group and having a dissociation constant smaller than $9 \times 10^{-11}$ with diketene at a temperature between room temperature and 100° C. in the presence in the reaction mixture of an enolising catalyst selected from the group consisting of tertiary amines and salts of such tertiary amines with weak acids, said arylamine and said catalyst being free from groups which interfere with the reaction under the conditions stated.

2. A process according to claim 1, wherein the aromatic amine has a negative substituent in the ortho position to the amino group.

3. A process according to claim 1, wherein the basic tertiary amine is triethylamine.

4. A process according to claim 1, wherein the basic tertiary amine is trimethylamine.

5. A process according to claim 1, wherein the reaction is carried out in an inert diluent which is a solvent for the reactants.

6. A process for the production of the acetoacetic acid amide of methyl anthranilate which comprises reacting methyl anthranilate with diketene at a temperature between room temperature and 100° C. in the presence in the reaction mixture of triethylamine.

7. A process for the production of the acetoacetic acid amide of m-nitro-p-toluidine which comprises reacting m-nitro-p-toluidine with diketene at a temperature between room temperature and 100° C. in the presence in the reaction mixture of triethylamine.

8. A process for the production of the acetoacetic acid amide of o-chloroaniline which comprises reacting o-chloroaniline with diketene at a temperature between room temperature and 100° C. in the presence in the reaction mixture of trimethylamine.

9. A process for the production of the acetoacetic acid amide of o-nitroaniline which comprises reacting o-nitroaniline with diketene at a temperature between room temperature and 100° C. in the presence in the reaction mixture of triethylamine.

10. A process for the production of the acetoacetic acid amide of diphenylamine which comprises reacting diphenylamine with diketene at a temperature between room temperature and 100° C. in the presence in the reaction mixture of triethylamine.

References Cited in the file of this patent

UNITED STATES PATENTS

| | | |
|---|---|---|
| 2,017,815 | Johnston | Oct. 15, 1935 |
| 2,115,413 | Dahlen et al. | Apr. 26, 1938 |
| 2,462,358 | Caldwell | Feb. 22, 1949 |
| 2,464,597 | McQueen | Mar. 15, 1949 |
| 2,561,205 | Jones | July 17, 1951 |
| 2,591,470 | Schmid et al. | Apr. 1, 1952 |

FOREIGN PATENTS

| | | |
|---|---|---|
| 273,950 | Switzerland | June 1, 1951 |
| 276,899 | Switzerland | Nov. 1, 1951 |
| 276,900 | Switzerland | Nov. 1, 1951 |

OTHER REFERENCES

Chemical Abstracts, vol. 43, page 1247 (1949).